United States Patent [19]
Perrier

[11] Patent Number: 5,961,069
[45] Date of Patent: Oct. 5, 1999

[54] CATAPULT EXIT SHOCK ABSORBER

[75] Inventor: Philippe Perrier, Saint Nom la Breteche, France

[73] Assignee: Dassault Aviation, Paris, France

[21] Appl. No.: 08/731,304

[22] Filed: Oct. 15, 1996

[30] Foreign Application Priority Data

Oct. 18, 1995 [FR] France .................................. 95 12231

[51] Int. Cl.⁶ ...................................................... B64F 1/04
[52] U.S. Cl. .............................................. 244/63; 104/289
[58] Field of Search ............................. 244/63; 104/289, 104/282, 292

[56] References Cited

U.S. PATENT DOCUMENTS

| | | |
|---|---|---|
| 2,240,947 | 5/1941 | Wilson . |
| 2,611,355 | 9/1952 | Ashwood .................................. 244/63 |
| 2,759,688 | 8/1956 | Gross . |
| 3,273,830 | 9/1966 | Scholl . |
| 3,968,947 | 7/1976 | Schlegel et al. .......................... 244/63 |
| 4,979,445 | 12/1990 | Lanzara . |

FOREIGN PATENT DOCUMENTS

| | | |
|---|---|---|
| 758548 | 1/1934 | France . |
| 3437073 | 4/1986 | Germany . |
| 725467 | 3/1955 | United Kingdom . |
| 1549430 | 8/1979 | United Kingdom . |

OTHER PUBLICATIONS

French Search Report, Jun. 20, 1996.

*Primary Examiner*—Charles T. Jordan
*Assistant Examiner*—Tien Dinh
*Attorney, Agent, or Firm*—Stevens, Davis, Miller & Mosher, L.L.P.

[57] ABSTRACT

The invention relates to a temporary towing device intended to impart a very high acceleration to a mobile mass (A, TAV, CF). It comprises a guidance device (G), a carriage (C) mounted so that it can slide with respect to this guidance device (G), a motive device (M, PI) for imparting a movement of acceleration along this guidance device (8, 9) to the carriage (C) in a direction running in the direction of acceleration of the mass (A, TAV, CF). Coupling means (CR) make it possible temporarily to secure the mass and the carriage together as they are accelerated. A braking device (F) makes it possible to brake the carriage at the end of the acceleration of the mass.

A device (1) for modulating the towing force (EC) is designed to bring the elements (TAV, CF) of the mass (A, TAV, CF) to the state of rest with respect to one another, or close to this state of rest, the moment the connection is broken.

Application to the catapult of an aircraft carrier.

23 Claims, 7 Drawing Sheets

CATAPULT EXIT SHOCK ABSORBER

BACKGROUND OF THE INVENTION

The present invention relates to a temporary towing device intended to impart a very high acceleration to a mobile mass and to reduce to a minimum the harmful mechanical effects to which there is a risk of the mobile mass being subjected when, at the end of acceleration, the coupling between this mass and the temporary towing device is broken.

More specifically, the invention relates to an improved catapulting device for aircraft carriers capable, if not of eliminating, at least of considerably reducing the detrimental effects to which the nose gear and overall structure and equipment of the airplane are subjected when this nose gear detaches itself from the hook of the catapult at the end of the take-off strip of the aircraft carrier.

The function of an aircraft carrier catapult is to give the airplane a very high acceleration over a short distance, in order to allow it to reach its flying speed over a length which is compatible with the dimensions of the aircraft carrier.

DESCRIPTION OF THE PRIOR ART

FIG. 1 of the attached drawings represents in a very diagrammatic way, two configurations of operation of such a catapult of the prior art together with the effects to which the nose gear of the airplane is subjected during catapulting.

It can be seen that such a catapult generally comprises running gear known as a "carriage" C equipped with a hook CR which is open toward the prow of the aircraft carrier (to the right in FIG. 1) and protrudes above the flight deck P so that it can be hooked onto a coupling member or "catapult launch bar" B secured to the nose gear TAV of the airplane A.

For a detailed description of one embodiment of nose gear equipped with such a catapult launch bar, reference may be made to U.S. Pat. No. 4,401,285.

The catapult also comprises a device G for guiding the carriage C associated with a towing device M making it possible to apply to the carriage a towing force which is equal to several times the weight of the airplane A to be catapulted. The towing device generally comprises one or more cylinders which can be pressurized by gas (generally steam) and thus capable of propelling pistons PI coupled to the carriage C. The energy supplied to the carriage may just as easily be of some other nature, for example electrical, electromagnetic or the like.

The catapult also includes a device F for braking or halting the carriage at the end of its travel. The aim is to reduce the length of this device as much as possible, so as to be able to exert the force of towing of the hook CR for as long as possible, a length of 1 to 2 meters being a value commonly used (which can be compared with the total length of the catapult which may be of the order of 50 to 100 m). The braking device F thus brings about a very abrupt drop in the towing force. This takes place in general over less than five milliseconds between the moment the carriage enters the brake and the moment the towing force in the catapult launch bar B of the airplane A is canceled out.

Now, while the catapult is towing, the structure of the airplane A, and quite specifically the nose gear, is put under tension by the towing force, the forces of inertia and possibly other forces such as the thrust of the engine or engines and the aerodynamic forces. When the towing force stops suddenly, all the elements which are under tension are released, and this induces damped oscillations, in the manner of a fully loaded spring which is set free. This phenomenon, known by specialists as "elastic return" is illustrated (in a highly exaggerated fashion) to the right in FIG. 1 of the attached drawings, respectively by the two extreme positions TAV-1 and TAV-2 that the nose gear can adopt alternately just after having left the hook CR.

Reference may also be made to FIGS. 2 and 3 in which the curves X1 and Y1 represent, on the one hand, the force ECF measured in an element CF connecting the nose gear to the structure of the airplane (also known as an "auxiliary strut") and, on the other hand, the towing force EC of the catapult.

In actual fact, for the effects dealt with here, the nose gear TAV can be likened to a mass-spring system in which the mass consists of the nose gear itself and the spring consists of the auxiliary strut CF. During the travel of the catapult, the towing force EC of the catapult is transmitted directly through the auxiliary strut (according to the curve Y1 in FIG. 3) causing a lengthening thereof which corresponds to the shifting of the nose gear TAV with respect to its position of equilibrium (see the left-hand sketch in FIG. 1).

The forces EC and ECF are more or less constant and equal during the travel of the catapult. When the carriage C enters the braking device F (see the middle sketch in FIG. 1), its deceleration is such that the towing force EC is canceled out very rapidly, typically in under 5 ms.

As soon as the towing force is canceled out, the catapult launch bar B separates from the hook CR which continues to decelerate. The nose gear/auxiliary strut assembly therefore behaves like a mass-spring system which is set free away from its position of equilibrium.

Return to the state of rest with respect to the structure of the airplane takes place by means of oscillations which are damped to greater or lesser extent, as shown in FIG. 2 in respect of the auxiliary strut CF. It is these oscillations which are transmitted to the airplane as a whole, in the form of shocks.

The phenomenon illustrated here as regards the nose gear in FIG. 1 occurs in a similar way for all of the elastic parts of the airplane which have been shifted from their position of equilibrium under the effect of the acceleration and were set free abruptly when the catapult launch bar B separated from the hook CR.

The frequency of the oscillations in the elements in question is generally a few tens of Hertz. For example, for a frequency of 50 Hertz, the first passage through the position of equilibrium takes place five milliseconds after the release of the corresponding element. This delay (t3 in FIG. 2) is comparable with the time taken for the drop in towing force due to the braking of the carriage. This means that the halting of the carriage substantially "accompanies" the elastic return movement, but does not oppose it. Given the energies involved, these oscillations constitute a shock which is potentially damaging for all the airplane equipment.

The elastic return also has the effect of loading up some elements of the structure of the nose gear or of the airplane as a whole, in the opposite direction to the one in which they were working when the catapult was towing. For example, the auxiliary strut CF works in compression when the nose gear TAV is in the position TAV2.

This means that airplanes with which naval air forces are equipped have to have special provisions for reinforcing not only the structure itself, but also much of the equipment, particularly that which is situated in the region affected by the elastic return of the nose gear. Now, this region generally contains a large amount of delicate equipment such as the radar and the pilot's flight equipment. This results in a considerable on-cost incurred solely through the need for the airplane and its equipment to be able to withstand the shock at the end of catapulting. The durability and reliability of this equipment may also be adversely affected by the repeated effects of the shocks.

The catapult launch bar B for its part has to lift up automatically as soon as the hook CR has released it. The oscillations mentioned above risk disrupting this lifting-up and risk folding the bar B downwards while the nose gear has not yet left the flight deck. This constitutes a real potential for danger or even for an accident, because the impact of the bar B on the deck may lead to breakage of some parts of the nose gear TAV or to debris being thrown up towards the engine or engines of the airplane.

The intensity of the shock at the end of catapulting depends directly on the towing force of the catapult just before the carriage enters the braking device F. This force itself depends essentially on the mass of the airplane to be catapulted and on the speed it has to be given to allow it to take off.

For a given aerodynamic configuration of an airplane, the greater the mass, the higher the speed it requires to allow takeoff. It may thus be seen that for a given airplane, the catapult exit shock will be the greatest for the heaviest configurations.

Thus, for airplanes currently in service, the masses may vary from a few tons to a few tens of tons and the catapult exit speed may lie between 50 and 100 m/sec, approximately. For a single airplane, depending on its configurations, the catapulting mass may even vary in a ratio close to 2.

It will thus be understood that the detrimental effects of the oscillations upon catapult hook release may be considerable.

It should be noted that in order to reduce the effects of the oscillations, it is possible to reduce the towing force well before the carriage C enters the braking device F. For example, catapults operating under pressurized steam generally comprise a cut-off device which interrupts the inlet of steam when the carriage C reaches a certain point on its travel, the consequence of this being a reduction in the towing force and therefore in the end-of-travel shock. However, this drop in force does not generally exceed 10 to 20% in order not to lose out on catapulting effectiveness. This measure, which is in fact aimed predominantly at saving steam in any case can do nothing toward avoiding the airplane constructor having to reinforce the structures and take precautions to protect the delicate equipment of the airplane against the shocks due to catapulting.

SUMMARY OF THE INVENTION

The object of the invention is to provide a temporary towing device intended to impart a very high acceleration to a mobile mass without the mobile mass being subjected to detrimental effects due to the mechanical oscillations produced when the temporary towing force is released. The invention applies in particular to the context of a catapult for an aircraft carrier.

The subject of the invention is therefore a device of the sort indicated at the beginning of this description, comprising a guidance device, a carriage mounted so that it can slide with respect to this guidance device, a motive device for imparting a movement of acceleration to said carriage along this guidance device in a direction running in the direction of acceleration of said mass and coupling means for allowing said mass and said carriage to be secured together temporarily as they are accelerated, said towing device also including a braking device for braking said carriage at the end of the acceleration of the said mass and for breaking the connection between it and said mass, the latter being composed of elements joined together elastically and capable of being displaced with respect to one another under the effect of the towing force, this device also comprising a device for modulating the towing force, which device is designed to bring the elements of said mass to the state of rest with respect to one another or close to this state of rest, the moment the connection between said mass and said carriage is broken.

Within the context of the invention, "state of rest" is intended to mean the situation in which the elements of which the mass is composed are substantially immobile with respect to one another and exert substantially no parasitic force on one another.

If these elements of the mass are compared to a system composed of a first element forming the mass proper and a second element forming a spring and consisting of those parts of the structure which join the parts of the mass together, it may be said that when stressed, this system stores up energy which has two components:

on the one hand, potential energy characterized by the tension in the second element and therefore by the separation between the position of the first element at a given moment and its position free of stress, and on the other hand, kinetic energy characterized by the rate of travel of this first element.

Applied to the specific case of the airplane, the first element is, for example, the nose gear TAV and the second element the auxiliary strut CF forming a "spring".

When the first element is separated from its position of equilibrium (by the towing force which has to accelerate the mass as a whole), it acquires potential energy. When the first element is then instantaneously released from this stressed position, it travels toward the position of equilibrium, gaining speed so that as it passes through the position of equilibrium, the speed is such that its kinetic energy is close to the potential energy which it had in the stressed position (there is a slight reduction on account of friction produced by the movement). Thus, the state of rest of the elements of the mass corresponds to the situation in which the speed of the first element is zero and the force exerted on the second element by the first element is also zero, the total energy of the system thus being zero.

Now, by virtue of the characteristics of the invention which has just been defined hereinabove, the elements of which the mass is composed are no longer stressed with respect to one another and are thus in the state of rest described hereinabove. In the case of the specific application of the invention to a catapult for an aircraft carrier, the modulation device ensures that at the end of catapulting, the nose gear of the airplane (comparable to said first element) and the auxiliary strut (representing said second element) in particular, no longer or virtually no longer stress each other once the airplane seen in its entirety has reached its flying speed.

BRIEF DESCRIPTION OF THE DRAWINGS

Other features and advantages of the invention will become clear during the description which will follow, given solely by way of example and made with reference to the attached drawings in which:

FIG. 1, already commented upon hereinabove, is a very simplified diagram of the operation of an aircraft carrier catapult according to the prior art;

FIG. 2 is a diagram as a function of time of the force to which the auxiliary strut of the nose gear of the airplane is subjected under the action both of a catapult of the prior art and of the one produced according to the invention;

FIG. 3 is a diagram as a function of time of the towing force exerted on the nose gear by a catapult of the prior art and by the one according to the invention;

FIG. 4 is a very simplified diagram of a catapult according to the invention;

FIGS. 6A, 6B and 6C show three views similar to those of FIGS. 5A, 5B and 5C of a second embodiment of the invention; and FIGS. 7, 7A, 8, 9A, 9B and 10 show another four embodiments of the catapult according to the invention.

FIG. 4 diagrammatically represents the concept according to the invention, in the form of a first embodiment.

This diagram again shows the elements already described with regard to FIG. 1, and to which the same literal references have been given.

However, according to the invention, the catapult shown diagrammatically in FIG. 4 also comprises a modulation device denoted overall by the numerical reference 1 and essentially comprising a weight 2 mounted so that it can slide in the guidance device G and provided with an elastically compressible element 3 which extends backwards in this guidance device G, that is to say in the opposite direction to the one in which the towing force of the catapult is exerted.

DESCRIPTION OF THE PREFERRED EMBODIMENT

During operation, the modulation device 1 is placed in the guidance device G in such a way that the rear end of the compressible element 3 is a predetermined distance d1 from the entry to the braking device F.

When the carriage C set in motion by the motive force strikes this end, kinetic energy is given to the modulation device 1, the elastic element 3 of which begins to compress and in doing so begins to move the weight 2 forward. The effect of this absorption of energy is to reduce progressively the towing force exerted by the hook CR on the catapult launch bar B according to a curve represented as Y2 in FIG. 3. The consequence of this reduction in towing force is a concurrent reduction in the force in the auxiliary strut CF of the airplane A according to the curve X2 in FIG. 2. According to the invention, the parameters involved are chosen in such a way that the moment the ram BL begins to enter the braking device F, as represented by FIGS. 2 and 3 at moment T, the towing force EC (FIG. 3) and the force ECF in the auxiliary strut CF (FIG. 2) become zero, while the rate of travel of the nose gear with respect to the airplane is canceled out. As it is at this moment T that the catapult launch bar B and of course the airplane as a whole begin to have a speed which is higher than that of the carriage C, the nose gear TAV and the structural elements of the airplane A are in a state which from that moment on is not stressed by the catapult.

The result of this is the elimination of the detrimental oscillations which means that the airplane constructor no longer has to worry about reinforcing the structure or providing specific protection for the equipment of the airplane.

Furthermore, there is no risk of the catapult launch bar B striking the flight deck and it can be lifted up in complete safety in the first few moments after take-off.

There are four key parameters involved in cancelling out the towing force and the force in the auxiliary strut at the moment T, and these are: the mass of the weight 2, the stiffness and initial compression of the elastic element 3 and the distance d1 between the entry of the braking device F and the initial position of the rear end of this elastic element 3.

The choice of these four parameters determines the sequence of events of the catapult over time. Referring to FIG. 2 it may be seen that the inherent oscillations of the nose gear (likenable to those in the auxiliary strut CF) have a period ti which, to give a concrete value to the concept and depending on the type of airplane concerned, may be of the order of a few tens of milliseconds, typically 20 ms.

It has been found that in order to cancel out the forces at the time T, it is advantageous to choose for the space of time t2 which has to elapse between the moment the carriage C strikes the mass and the moment T a value of between one third of and twice the period t1. In the example chosen, this space of time would therefore be between 6 and 40 ms and would preferably be chosen equal to 35 ms for an airplane of given mass and given configuration.

The parameters mentioned hereinabove may easily be adjusted, even while the catapult is in use. Thus, for example, the modulation device 1 may be mounted so that it can move in the guidance device G, being provided, for example, with rollers and with an autonomous drive motor. Moreover, a weight composed of several elemental masses that can be arranged in the guidance device G as required may be envisaged. The initial compression of the elastic element 3, advantageously produced in the form of a helical spring, may be set by means of a stop (not represented) placed behind this spring and connected to the weight 2 by a screw (also not represented) allowing the maximum length of the spring to be adjusted.

In the example which has just been described, the parameters are chosen such that at the beginning of braking, the forces ECF and EC become zero at the same time as the rate of travel of the nose gear TAV with respect to the structure of the airplane cancels out. However, the reduction thus brought about in the towing force also reduces the overall effectiveness of the catapult.

With the objective of reducing the catapult performance as little as possible, the parameters of the modulation device according to the invention may also be adjusted so that the towing force EC, after having decreased in a first phase, increases again slightly just before the instant the carriage begins to slow down. (See curve Y4 in FIG. 3). In this way, the dip in towing force may occur later, with the nose gear TAV nevertheless being able rapidly to return to the position of rest before separation from the hook CR (see curve X4 in FIG. 2).

In order to obtain this modulation curve Y4, a stiffer elastic element or spring 3 will be chosen, while the modulation device as a whole will be placed closer to the entry of the braking device F than in the previous case. The increase in towing force is obtained by the relaxation of the spring after it has gone through a maximum of compression.

Figures 5A, 5B, 5C:
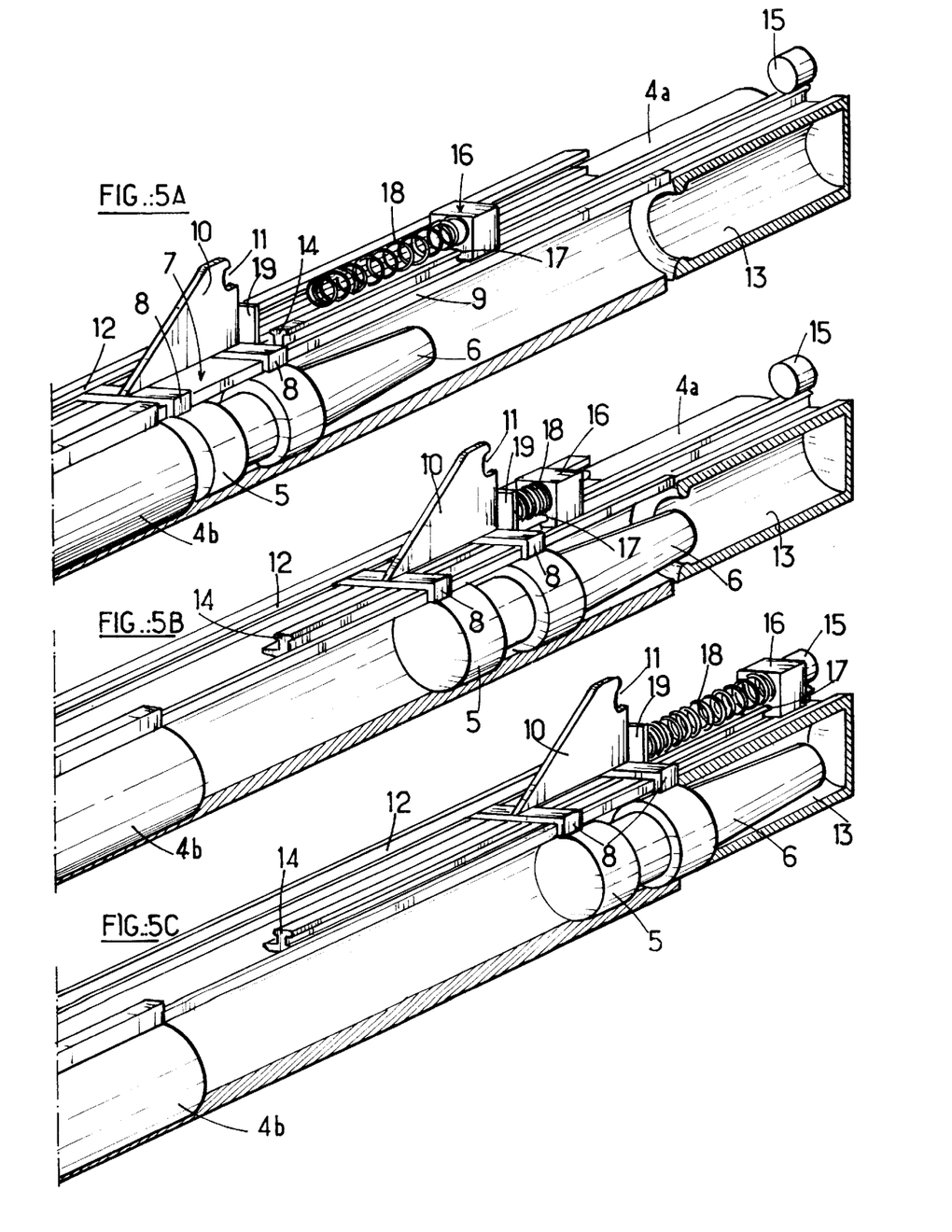
FIGS. 5A, 5B and 5C show, in perspective part views, three configurations exhibited by a first embodiment of a catapult according to the invention during its operation.

Reference will now be made to FIGS. 5A to 5C to describe a concrete example of the temporary towing device according to the invention in its application to a catapult for aircraft carriers.

This catapult comprises two cylinders 4a and 4b which are juxtaposed and run longitudinally with respect to the direction of the take-off strip of the aircraft carrier beneath the upper deck thereof. Their length may reach fifty to one hundred meters, for example.

A piston 5 (just one of these is visible in the figures) slides in each cylinder 4a, 4b under the action of pressurized steam which is injected at their upstream end by an injection installation known per se and not represented in the drawings.

Each piston 5 carries a ram 6 which is in the form of a cone frustum stretching out on the downstream side.

Furthermore, each piston is secured to a single carriage 7 by means of connection elements 8 which pass upward from the respective piston through a longitudinal slot made all the way along each cylinder 4a, 4b. A longitudinal seal (not represented and which may be of the type described in U.S. Pat. No. 4,252,285) seals the cylinders, while allowing the carriage to pass when the catapult is operating.

The carriage secured to the two pistons 5 is thus guided by the movement of each of these in their respective cylinders 4a, 4b and possibly by other guidance means known per se.

An element 10 provided with a cutout 11 on its downstream edge and fixed securely to the carriage 5 acts as a hook and crosses through a slot (which is not visible in FIGS. 5A, 5B and 5C) made in the deck of the aircraft carrier.

The downstream end (therefore at the end of the take-off strip) of each cylinder 4a, 4b is closed by a braking device 13 which operates on the principle of the expulsion of water when the ram 6 of the piston 5 enters it.

It will be observed that the structure which has just been described is conventional and commonly used in catapults for aircraft carriers.

According to the invention, a rail 14 is fixed between the two cylinders 4a and 4b. It runs parallel to the cylinders backward over a predetermined distance starting from the downstream end of the catapult where a buffer 15 is provided.

A weight 16 is mounted so that it can slide along the rail 14, while being guided thereon by means of a groove 17 of a shape which complements this rail 14 and is formed in the weight 16. A coil spring 18 is fixed to the weight 16 and runs backward parallel to the axes of the cylinders 4a and 4b. This spring is intended to interact with a transverse striker plate 19 fixed against the front edge of the hooking plate 10 of the carriage 7.

The operation of this catapult becomes clear from examining FIGS. 5A to 5C which represent three phases of the operation.

In FIG. 5A, the carriage 7 has been started (the airplane is not represented) and is in the process of reaching the region of the modulation device 1. The coil spring 18 is still relaxed and the weight 16 is still immobilized on its rail 14.

In FIG. 5B, the plate 19 has compressed the spring 18 which has in turn caused the weight 16 to advance along its rail 14. The front end of the ram 6 is just at the entry to the braking device 13. This figure corresponds to the moment T of FIGS. 2 and 3; the forces ECF and EC have become zero and the nose gear TAV is leaving the hook 10, 11 without being subjected to any oscillation.

In FIG. 5C, the catapult has reached the end of its travel. The ram 6 is entirely engaged in the braking device 13 and therefore halted, the weight 16 being stopped against the buffer 15 and the spring 18 is relaxed again.

The carriage 7 can be pulled back as far as the opposite ends of the cylinders 4a and 4b and the modulation device returned to the position of FIG. 5A so that the catapult can begin another cycle of use.

FIGS. 6A to 6C represent an alternative form of the invention, in which the weight 16A is formed of a generally cylindrical body sliding along a rail 14A arranged between the cylinders 4a and 4b. This cylindrical body includes a guide rod 20 over which the coil spring 18 is slipped, thus preventing it from buckling as it is compressed. In addition, this cylindrical body is equipped at each of its ends with fixtures 17A fitted to the rail 14 to allow it to be guided along this rail.

Moreover, the carriage 7 carries a striker plate 19A in which an opening 21 is made to allow the guide rod 20 of the weight 16A to pass through.

FIGS. 6A to 6C represents the catapult in this alternative form in the same respective positions as FIGS. 5A to 5C.

FIG. 7 represents another alternative form of the invention, in which the weight 16B is formed of a telescopic body with a cylinder 22 and a piston 23 guided in this cylinder. The spring 18 is slipped around the cylinder 22, while an additional spring 24 is placed inside the latter. A fluid contained in the cylinder allows a damping effect to be obtained as it passes from one side of the piston 23 to the other. This arrangement makes it possible to deaden the impact of the assembly 1B against the buffer 15.

FIG. 7A shows another embodiment of the invention wherein the elastic element of the modulation device is a gas spring. More particularly, in this case, the modulation force is obtained by compressing a volume of gas confined in a space 31 defined by a cylinder forming weight 32. The weight is mounted on the catapult, in a manner similar to weight 16A or 16B.

The cylinder is closed at its downstream end and blocked by a piston at its upstream end. The carriage 7 comprises a ram 34 extending downstream and able to engage weight 32 through upstream end wall 35 of the latter so as to push the piston forward and thus to compress the gas volume. The length of ram 34 substantially corresponds to the length of travel of piston 33 within space 31.

In this embodiment, the gas volume is advantageously already under pressure or precompressed so that a significant modulation force may be generated as soon as the piston starts moving.

Thus, as a matter of example only and for a given airplane and a given catapult, the length of space 31 may be chosen between 1 and 2 m and the gas may be compressed beforehand to a pressure of between a few tenths to a few hundred bars, while the length of the ram may be of about between 1 and 2 m.

FIG. 8 shows another embodiment in which the modulation device 1C is formed by one or more vents 25 made in the wall of the cylinders 4a and 4b close to their downstream ends. As an option it may be possible for these vents to be closed by flaps 26. Their purpose is to create deliberate leakage, preferably an adjustable one, in the cylinders 4a and 4b in order to reduce the steam pressure therein and thus reduce the force that the piston 5 can impart to the carriage 7. By carefully distributing these vents along the length of the cylinders, it is possible to obtain a modulation curve like the one represented as Y3 in FIG. 3 and succeed in creating forces which are zero at the moment T. FIG. 8 also shows part of the deck of the aircraft carrier together with one edge of the slot 12 made therein for the catapult.

Figure 9:
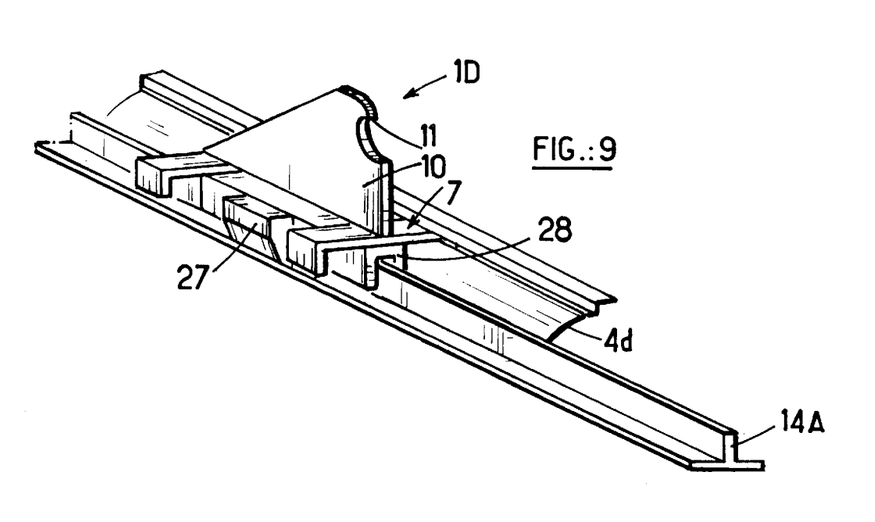

FIG. 9 diagrammatically represents another embodiment of the invention in which a modulation device 1D makes it possible to modulate the towing force using an action of braking a part secured to the carriage 7 against a part secured to the cylinders 4a and 4b of the catapult.

Thus, a rail 14A having an inverted T profile is integral with the two cylinders 4a and 4b, running between these like the previously described rail 14. In this case, the carriage 7 is equipped with an element (symbolized as 27 in FIG. 9) allowing the braking force to be applied to the rail 14A.

This braking force may be of different types. For example, the carriage 7 may be provided with one or more brake shoes 28A of FIG. 9A acting by friction on the rail 14A and actuated by an appropriate command device known per se. The brake may then advantageously be in the form of a set of jaws 28 as represented diagrammatically in FIG. 9.

An alternative form of this embodiment shown in FIG. 9B consists in equipping the carriage with a generator of magnetic field directed perpendicularly to the vertical part of the rail 14A, like an electromagnet 28B or permanent magnet capable of generating eddy currents in the rail 14A as the carriage 7 moves. The use of an electromagnet would make it easy to adjust the braking force by varying the electric magnetization current.

Figure 10:
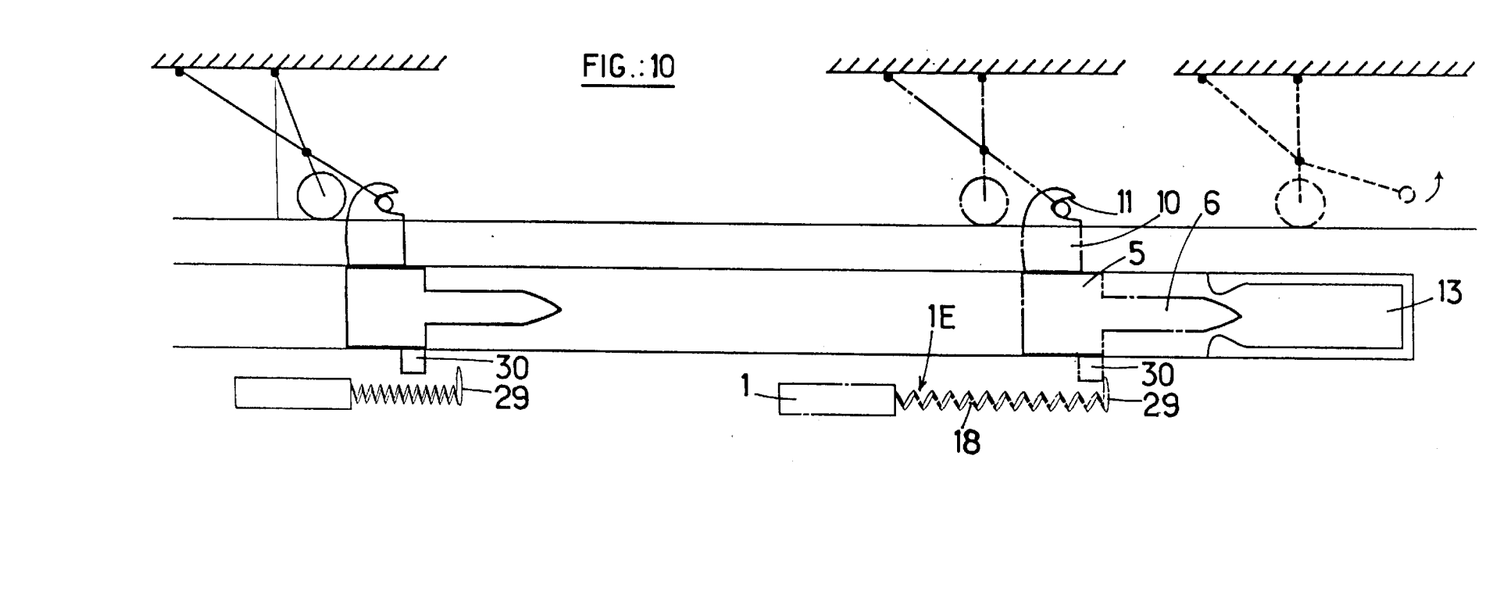

Finally, according to the embodiment of FIG. 10, the modulation device 1E according to the invention is of the type represented in FIGS. 4 to 5C, except that the weight 16 is placed behind the spring 18, the latter being equipped with a catching member 29 interacting with a striker lug 30 provided on the piston 5. This unit is housed beneath the cylinders 4a and 4b.

In this case, the equipment formed by the modulation device 1E is pulled along by the carriage 7 instead of being pushed, and this does not fundamentally alter the way it works.

It will therefore be seen that by virtue of the invention, varying the operating parameters of the modulation device makes it possible to obtain a satisfactory compromise between the various operating conditions to be fulfilled by the catapult as regards driven mass and flying speed of the on-board airplanes and their flight configurations, without the structures of these airplanes having to be specially adapted with a view to the catapult exit shock.

Although the invention has been described in its specific application to a catapult for an aircraft carrier, it will be understood that it may be used in all cases where an object needs to be accelerated temporarily, then left free to continue its movement. Likewise, it will be understood that the concepts of the invention can be applied whether the movement of the object is in a straight line or in a curve.

In particular, the invention may advantageously be applied to all cases where the object to be accelerated is a complex assembly which has parts which are sensitive to the end of acceleration shock. This may be the case, for example, with satellites, missiles, torpedoes or objects intended for laboratory tests. For these applications, the characteristics of the invention will be adapted to suit the physical characteristics of the object (mass, speed, acceleration, period of the oscillations due to the shock) using the conventional rules of mechanics.

I claim:

1. A towing device for exerting a towing force to impart a very high acceleration to a mobile mass, the mobile mass comprising elements joined together elastically and capable of being displaced relative to one another under the towing force, the device comprising:

a guidance device;

a carriage mounted to slide with respect to the guidance device;

a motive device for imparting a movement to said carriage along the guidance device in a direction of the acceleration of said mass;

coupling means for providing a connection between said mass and said carriage as said mass and said carriage are accelerated;

a braking device for braking said carriage at an end of the acceleration of the mass and for breaking the connection between the carriage and said mass;

a modulation device for modulating the towing force to bring the elements of said mass to a state of rest with respect to one another or close to the state of rest at a moment in which the connection between said mass and said carriage is broken;

wherein said modulation device comprises a weight mounted to slide freely in the direction of the acceleration of said mass between said carriage and said braking device and provided with an elongate elastic element running in said direction of the acceleration so as to be struck by said carriage in a final phase of the acceleration before said connection is broken.

2. The towing device as claimed in claim 1, wherein said elastic element is placed upstream of said weight with respect to the direction of the acceleration of said mass and wherein said modulation device is pushed by said carriage.

3. The towing device as claimed in claim 1, wherein said elastic element is placed downstream of said weight with respect to the direction of the acceleration of said mass, and wherein said modulation device is pulled by said carriage.

4. The towing device as claimed in claim 1, wherein said elastic element comprises a helical spring.

5. The towing device as claimed in claim 4, wherein said weight comprises a guide rod for guiding said spring as said spring is compressed.

6. The towing device as claimed in claim 1, wherein said elastic element comprises a gas spring.

7. The towing device as claimed in claim 6, wherein said gas spring contains a precompressed gas.

8. The towing device as claimed in claim 6, wherein said weight comprises a gas confined in a space and a piston slidably mounted within said space, and wherein said carriage comprises a ram for pushing the piston forward within said space.

9. The towing device as claimed in claim 1, wherein said weight includes a hydraulic damper for deadening an impact of said weight against a buffer placed at a downstream end of travel of said modulation device.

10. The towing device as claimed in claim 1, wherein said weight comprises a plurality of elemental weights for being put in place or removed in accordance with a configuration of said mass.

11. The towing device as claimed in claim 1, further comprising a position-adjustment device for adjusting a position of said modulation device each time before said mass is launched.

12. The towing device as claimed in claim 1, further comprising a device for setting an initial tension of said elastic element each time before said mass is launched.

13. A towing device for exerting a towing force to impart a very high acceleration to a mobile mass, the mobile mass comprising elements joined together elastically and capable of being displaced relative to one another under the towing force, the device comprising:

a guidance device;

a carriage mounted to slide with respect to the guidance device;

a motive device for imparting a movement to said carriage along the guidance device in a direction of the acceleration of said mass;

coupling means for providing a connection between said mass and said carriage as said mass and said carriage are accelerated;

a braking device for braking said carriage at an end of the acceleration of the mass and for breaking the connection between the carriage and said mass; and a modulation device sliding freely in the direction of the acceleration of said mass for modulating the towing force to bring the elements of said mass to a state of rest with respect to one another or close to the state of rest at a moment in which the connection between said mass and said carriage is broken, the modulation device modulating the towing force gradually before said moment.

14. The towing device as claimed in claim 13, wherein said motive device comprises at least one cylinder/piston assembly for being pressurized by a propelling gas, and wherein said modulation device comprises at least one opening made in said at least one cylinder/piston assembly for providing a leakage of said propelling gas from said at least one cylinder/piston assembly.

15. The towing device as claimed in claim 14, wherein the modulation device further comprises leakage adjust means for adjusting the leakage.

16. The towing device as claimed in claim 15, wherein the leakage adjust means comprises at least one flap for selectively closing the at least one opening.

17. The towing device as claimed in claim 13, further comprising an adjustment device for adjusting said towing force, wherein said modulation device is incorporated into said adjustment device to modulate the towing force by direct adjustment of the towing force.

18. The towing device as claimed in claim 13, wherein said modulation device comprises a braking device including a rail running in the direction of said acceleration in a downstream part of travel of said carriage, and a device borne by said carriage for generating a force for braking the carriage with respect to said rail.

19. The towing device as claimed in claim 18, wherein said device borne by said carriage for generating the braking force comprises at least one brake shoe for being actuated to act on said rail.

20. The towing device as claimed in claim 18, wherein said device borne by said carriage for generating the braking force comprises a generator of a magnetic field for being activated to act on said rail by means of eddy currents.

21. A towing device for exerting a towing force to impart a very high acceleration to a mobile mass, the mobile mass comprising elements joined together elastically and capable of being displaced relative to one another under the towing force, said elements oscillating with an inherent period of oscillation after said towing force is suddenly released therefrom, the device comprising:

a guidance device;

a carriage mounted to slide with respect to the guidance device;

a motive device for imparting a movement to said carriage along the guidance device in a direction of the acceleration of said mass, the motive device comprising at least one cylinder/piston assembly for being pressurized by a propelling fluid;

coupling means for providing a connection between said mass and said carriage as said mass and said carriage are accelerated;

a braking device for braking said carriage at an end of the acceleration of the mass and for breaking the connection between the carriage and said mass;

a modulation device for modulating the towing force, which device is designed to bring the elements of said mass to a state of rest with respect to one another or close to the state of rest at a second moment in which the connection between said mass and said carriage is broken, said modulation device being so controlled as to start modulation of said towing force at a first moment occurring before said second moment and spaced in time with respect to said second moment by an interval of time which is between one third and twice said period of oscillation.

22. The towing device as claimed in claim 21, wherein the leakage means comprises at least one opening in the at least one cylinder/piston assembly.

23. The towing device as claimed in claim 21, wherein the leakage means further comprises at least one flap for selectively closing the at least one opening.

* * * * *